(12) United States Patent
Hisada et al.

(10) Patent No.: US 7,985,487 B2
(45) Date of Patent: Jul. 26, 2011

(54) CORROSION RESISTANT CONDUCTIVE PARTS

(75) Inventors: Takeo Hisada, Minami-ku (JP); Yasushi Kaneta, Minami-ku (JP); Shinobu Takagi, Minami-ku (JP); Naoki Fuse, Minami-ku (JP)

(73) Assignee: Daido Steel Co., Ltd., Nagoya (JP)

( * ) Notice: Subject to any disclaimer, the term of this patent is extended or adjusted under 35 U.S.C. 154(b) by 0 days.

(21) Appl. No.: 10/981,708

(22) Filed: Nov. 5, 2004

(65) Prior Publication Data

US 2005/0100758 A1    May 12, 2005

(30) Foreign Application Priority Data

Nov. 7, 2003   (JP) .................................. 2003-378533

(51) Int. Cl.
  *B32B 15/18*   (2006.01)
  *C25D 3/48*    (2006.01)
  *C25D 7/00*    (2006.01)

(52) U.S. Cl. ........................................ 428/672; 428/685

(58) Field of Classification Search .................. 428/672; 420/512; 429/144

See application file for complete search history.

(56) References Cited

U.S. PATENT DOCUMENTS

| | | | |
|---|---|---|---|
| 6,203,936 B1 * | 3/2001 | Cisar et al. | 429/44 |
| 6,426,161 B1 * | 7/2002 | Cisar et al. | 429/38 |
| 6,835,487 B2 * | 12/2004 | Takao et al. | 429/34 |
| 6,866,958 B2 * | 3/2005 | Vyas et al. | 429/38 |
| 7,141,812 B2 * | 11/2006 | Appleby et al. | 250/505.1 |
| 2003/0068523 A1 * | 4/2003 | Kaneta et al. | 428/672 |
| 2004/0081879 A1 * | 4/2004 | Washima et al. | 429/34 |
| 2005/0158607 A1 * | 7/2005 | Vyas et al. | 429/34 |
| 2005/0244700 A1 * | 11/2005 | Elhamid et al. | 429/34 |

* cited by examiner

*Primary Examiner* — Timothy M Speer
*Assistant Examiner* — Jason L Savage
(74) *Attorney, Agent, or Firm* — Posz Law Group, PLC

(57) ABSTRACT

Disclosed is a corrosion resistant conductive part, which is made by forming a thin plated gold layer of thickness 100 nm or less on a stainless steel sheet, and for which high corrosion resistance is guaranteed even with a very thin gold layer. The part is characterized in that the maximum value "v" of atomic concentration of gold given by Auger analysis is at least 98% of the total atomic concentrations of all the elements, which is deemed to be 100%, in the thin gold layer ranging from the surface to the interface of the gold layer and the metal substrate, at which the descending curve of gold crosses the ascending curve of the most predominant component of the substrate metal.

15 Claims, 4 Drawing Sheets

CORROSION RESISTANT CONDUCTIVE PARTS

BACKGROUND OF THE INVENTION

1. Technical Field

The present invention concerns corrosion resistant conductive parts. More specifically, the invention concerns parts, which are resistant to corrosion and electrically conductive, produced by direct plating (hereinafter referred to as simply "plating" or "plate") of gold (hereinafter, "Au") on a substrate sheet of a metal such as stainless steel. The "direct" plating means the plating without any other plated layer between the precious metal and the metal substrate. The main use of the corrosion resistant conductive parts according to the invention is metallic separator of fuel cells.

2. Prior Art

For the purpose of maintaining corrosion resistance and decreasing electric contact resistance of metal separators as well as electric collectors of fuel cells there has been proposed to plate Au as a thin layer on a metal substrate such as stainless steel (Japanese Patent Disclosure No. 10-228914). According to the proposal, an Au layer of 0.01 to 0.06 μm thick directly plated on a stainless steel substrate may withstand nitric acid aeration test (JIS H8621). Even after elapse of one hour no dissolution of chromium is observed, and therefore, no pinhole is considered to be formed.

However, in practical polymer electrolyte fuel cells metal separators are, due to such a high working temperature near 100° C., subjected to severer environment, and therefore, such higher corrosion resistance that the separators withstand boiling sulfuric acid of pH 2, and that even after 168 hours immersion no substantial dissolution of metal ions occurs is required. The problem can be solved by increasing thickness of the plated layers. However, fuel cell stacks require piling up of many metal separators and thus, thickness of the plated layer must be 100 nm or less for practical use in view of the manufacturing costs. A targeted thickness of the plated layer is 20 nm or less.

The inventors pursued the reason why corrosion resistance of the conventional Au-plated products is insufficient, and learned that there exists unexpectedly much amounts of impurities on the surfaces of the metal substrates and in the plated thin Au layers, which causes formation of pinholes in the Au thin layers to lower the corrosion resistance of the thin layers, and that there is an intermediate layer containing the impurities between the thin Au layers and the metal substrates, which weakens the adhesion of the thin layers to the metal substrates.

The inventors made research and development to seek after corrosion resistant conductive parts, particularly, metal separators of fuel cells prepared by disposing a precious metal thin layer on a metal substrate with very few pinholes in the thin layer, which has dense structure and strongly adhered to the metal substrate, and therefore, can stand with severe environment of using. They discovered that the amounts of the impurities in the Au layers must be regulated to the following limits, C: up to 1.5%, P: up to 1.5%, O: up to 1.5%, S: up to 1.5% and C+P+O+S: up to 4.0%. The discovery matured in an invention was already disclosed (Japanese Patent Application 2002-312226).

In order to obtain such an appropriate plated Au layer technology of cleaning surface is important. It is necessary to remove contaminated film covering the metal substrate by physical and/or chemical means so that a clean surface may be exposed, and to form an Au plated layer immediately thereafter prior to occurrence of the second contamination of the surface. Cleaning by electropolishing is suitable for this purpose. These facts were also disclosed in connection with the above invention.

As the further study the inventors searched the conditions for providing high corrosion resistance to the corrosion resistant conductive parts having a plated Au layer of such a thickness as 20 μm or less, the inventors obtained some new knowledge.

SUMMARY OF THE INVENTION

The object of the present invention is to provide, by using the above-mentioned novel knowledge of the inventors, corrosion resistant conductive parts, even with very thin Au layers, by applying the conditions which guarantee high corrosion resistance for the parts.

The corrosion resistant conductive part of the invention is a corrosion resistant part made by forming a thin Au layer of a thickness of 100 nm or less on at least a part of the surface of a metal substrate, characterized in that the maximum value "v" of atomic concentration of Au given by Auger analysis is 98% or more of the total atomic concentrations of all the elements, which is deemed to be 100%, in the thin Au layer ranging from the surface to the interface of the Au layer and the metal substrate.

Figure 3:
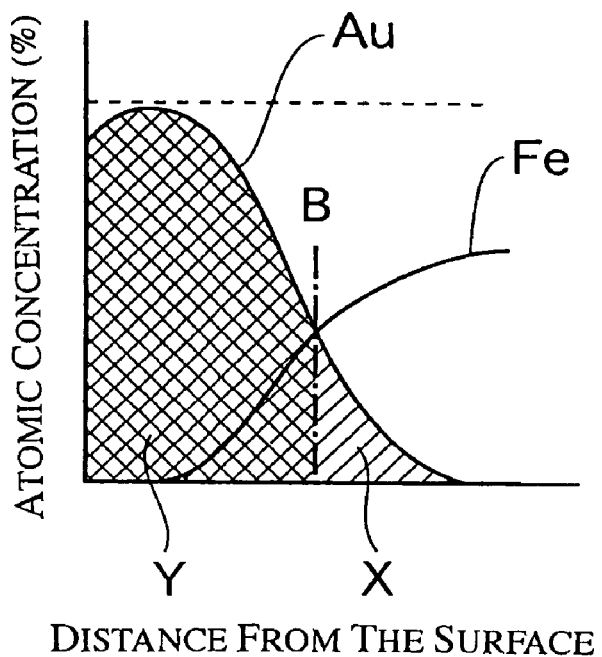
FIG. 3 is another conceptional chart of Auger analysis showing a preferable embodiment of the invention corresponding to FIG. 2.

Here, "the interface of the Au layer and the metal substrate" means an interface which is regarded to be in the location at which, when the atomic concentration given by Auger analysis of a corrosion resistant conductive part are plotted to curves in a graph, the descending curve of Au crosses ascending curve of the most predominant component. Such an interface exists at the location shown with reference "B" in FIG. 3.

Figure 2:
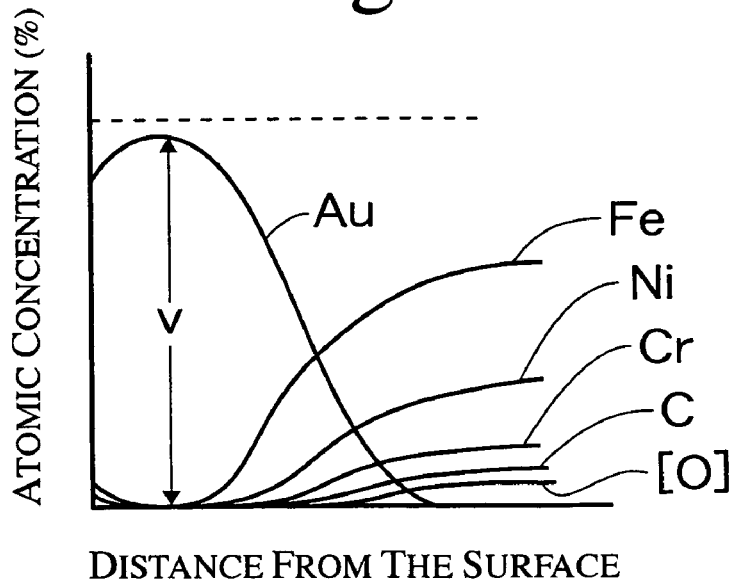
FIG. 2 is a chart of Auger analysis obtained in practical Au-plating corresponding to FIG. 1.

"The maximum value 'v' of atomic concentration of Au" is the value at the point 'v' in FIG. 2. Also, "the total detected atomic concentrations of all the elements in the thin Au layer ranging from the surface to the interface of the Au layer and the metal substrate" corresponds to the level in the axis of ordinate of the graph at which the atomic concentration is 100%. What is meant by "v is 98% or more" is that the purity of Au at the point of the highest purity is 98% or more.

DETAILED EXPLANATION OF THE PREFERRED EMBODIMENTS

In order to realize the condition mentioned above "that the purity of Au at the point where the purity of Au is highest is 98% or more" it is necessary to suppress the impurity contents in the bath of Au plating. Also, it is desirable to make the surface of the metal substrate sufficiently flat and smooth in the treatment step prior to the Au plating by an appropriate means such as electropolishing. The extent of the smoothness to be achieved will be, after the electropolishing, 50 nm or less as the averaged roughness "Ra" in the measurement range of 50 μm.

Figure 1:
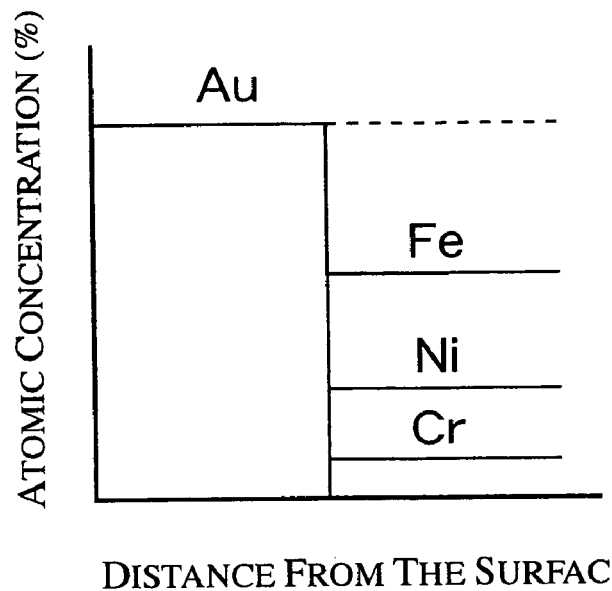
FIG. 1 illustrates a conceptional chart of Auger analysis where ideal plating is carried out, and is for explanation of the principle of the invention in relation to the structure of surface domain of a corrosion resistant conductive part.

If the Au plating on the metal substrate is carried out in ideal situation, then the layer structure would be as shown in FIG. 1, where a pure Au layer covers the surface of the metal substrate. However, apart from the adhesion of the plated layer to the substrate, it was found that the real layer structure is as shown in FIG. 2, where a layer in which Au and the components of the substrate metal are mixed exists in a certain thickness. Based on the graph of atomic concentration of Auger analysis, as shown in FIG. 2, at the transitional part from Au to the substrate metal, there exists a mixed layer of Au and various components of the substrate metal having a certain thickness.

According to the atomic concentration of Au the surface of the plated product is contaminated by small amounts of C (carbon) and/or O (oxygen), and therefore, the purity of Au is somewhat lowed, and at a certain depth the purity of Au reaches to the maximum value "v" and then gradually decreases to zero. On the other hand, if attention is paid to the atomic concentrations of the components of the substrate, it is recognized that the amount of Fe, which is the most major component in the stainless steel, gradually increases to be larger than that of Au to the most predominant level, and finally runs up to a constant level determined by the alloy composition. The other alloy components, Ni and Cr, show the similar tendency. The point where the curve of Au crosses the curve of Fe is the "interface of Au layer and the substrate metal".

It was found that, in addition to the requisites for the present corrosion resistant conductive parts, there were some further conditions preferably to be met. The following explains them.

The first one is the condition that, when the value "L" obtained by integrating the atomic concentration of Au given by Auger analysis from the surface to the interface where Au substantially disappears is compared with the value "M" obtained by integrating the atomic concentration of Au in the Au thin layer from the surface to the interface of Au and the substrate metal, $(M/L) \times 100(\%)$ is 90% or higher. In reference to FIG. 3, the value M/L is the percentage of the area with right-side down hatchings to the area with right-side up hatchings. This value M/L is a measure showing the extent how much of all the Au given by the plating exists in the plated layer where Au is dominant. From another view it is a measure whether, in the corrosion resistant conductive parts according to the invention, Au is efficiently contributes to the corrosion resistance. In other words it is a measure of the extent how the corrosion resistance exhibited by Au is prevented by the other components.

In order to achieve that the value of $(M/L) \times 100(\%)$ is 90% or higher it is necessary to take the same care as the requisite to realize that Au purity in the Au layer is 98% or higher at the highest purity level. It is necessary, though ascertained in the case where stainless steel is used as the substrate metal, to decrease the contents and the scatter of the impurities in Au-plating. Surfaces of the metal substrate on which plating is carried out should be treated to increase flatness and smoothness by a suitable means such as electropolishing. More specifically, it is preferable that the averaged surface roughness "Ra" in the measured area of 5 μm$^2$ is 50 nm or less.

Figure 4:
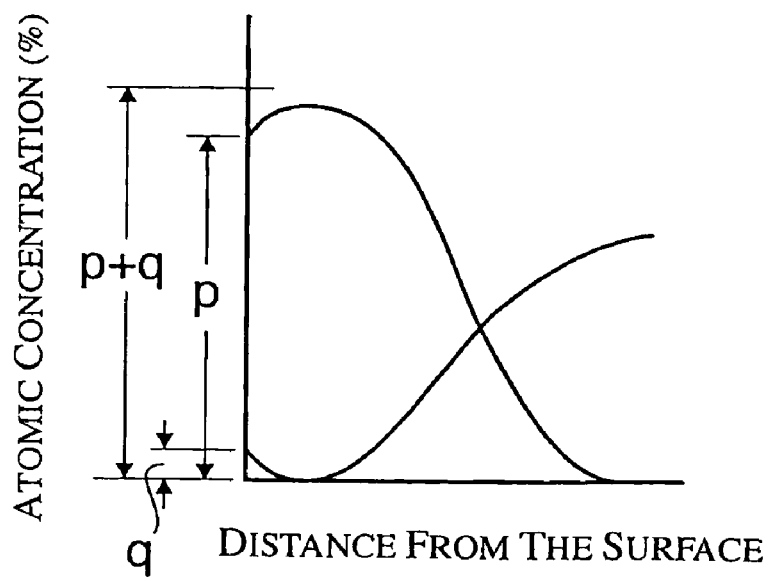
FIG. 4 is also a conceptional chart of Auger analysis showing a still other preferable embodiment of the invention.

Further preferable embodiment fulfills the condition that $[p/(p+q)] \times 100(\%)$ is 90% or higher, where "p" is the atomic concentration of Au given by Auger analysis at the surface, and "q" is the total atomic concentrations of the elements other than Au given by Auger analysis at the surface. Needless to say, p+q=1.00, the value $p/(p+q) \times 100(\%)$ is the percentage of "p" on the axis of ordinate in FIG. 4. This condition corresponds to the Au-purity at the surface of the present corrosion resistant conductive parts.

The condition for achieving that $[p/(p+q)] \times 100(\%)$ is 90% or higher does not differ from the above explanation concerning achievement of the requisites or optional but preferable conditions. Namely, one is to suppress the contents and the scatter of the impurities in the plating baths. The other is to enhance the flatness and smoothness of the surface of the metal substrate, more specifically, to the extent, as mentioned above, that the averaged roughness "Ra" in the measurement area of 50 μm$^2$ is 50 nm or less. Furthermore, it is recommended to shorten the interval time before and after the stream-cleaning, or cleaning by pouring cleaning liquid, following to the surface smoothing treatment such as electropolishing and prior to the plating step as possible.

It is desirable that as many as possible of the above-explained three preferable conditions are satisfied, and proportionally to the extent of satisfaction, the corrosion resistance of the parts according to the invention will be higher.

In the corrosion resistant conductive parts having the plated Au layer, which fulfills the conditions of the invention, purity of Au in the plated layer is high, i.e., contents of the impurities are low, and therefore, defects damaging the corrosion resistance such as pinholes are so few that the parts always exhibit high corrosion resistance.

The significance of the corrosion resistant conductive parts according to the invention will be extremely high when the invention is applied to production of fuel cell separators. The products made by plating Au on metal substrates are used as various contacting parts or terminal parts of electric circuits, and thus, the invention may be useful in such application.

EXAMPLES

Surfaces of a sheet of an austenitic stainless steel, SUS 316L (0.15 mm thick), were cleaned through the following steps.
1) Degreasing: The sheet is immersed in a solution of sodium orthosilicate 40 g/L and a surfactant 1 g/L kept at 60° C. for 1 minute;
2) Cleaning and Drying: The degreased sheet is treated with ultrasonic wave in pure water, and then stood still in dry air, or dry nitrogen gas is blown thereto;
3) Removing Contaminated Film (Electropolishing): The dried sheet is electrolyzed as anode in a 10%-sulfuric acid solution kept at 60° C. for about 1 minute under a current density of about 5A/dm$^2$;
4) Cleaning and Drying: as described above; and
5) Activation: The sheet is immersed in a 10% sulfuric acid solution kept at 60° C. After about 1 minute, the sheet is stream-cleaned by pouring pure water thereon.

Example 1

Immediately after the above activation the stainless steel sheets were electroplated with Au to form a plated Au layer of thickness 10 nm. The resulting corrosion resistant conductive parts were, after being cleaned and dried, subjected to Auger analysis. From the graphs of the atomic concentration peaks values of Au were found to determine the values "v", and the integrated values of "M" and "L" were calculated to determine the ratios (M/L)×100(%). Also, based on the values of "p" and "q" at the surface, the ratios [p/(p+q)]×100(%) were calculated. The results are shown in Table 1.

Figure 5:
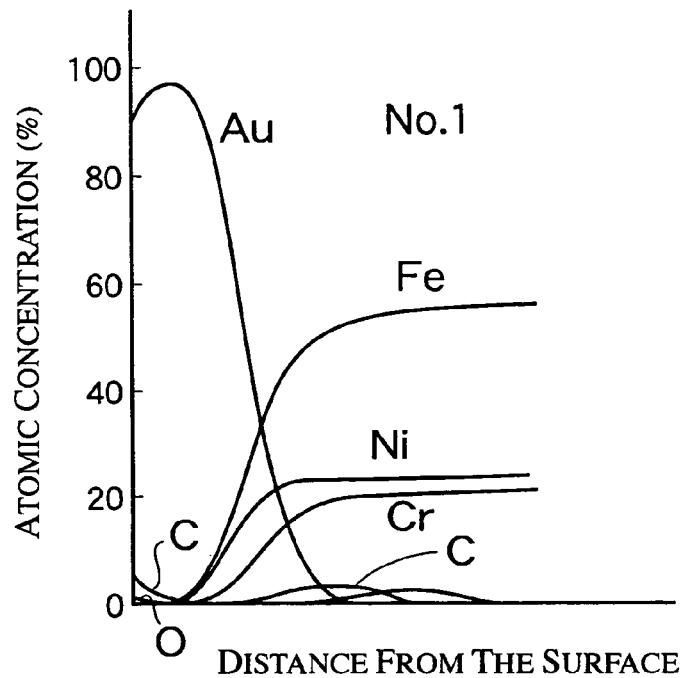
FIG. 5 is a chart of Auger analysis given in Example 1, No. 1 of the working example of the invention.
Figure 6:
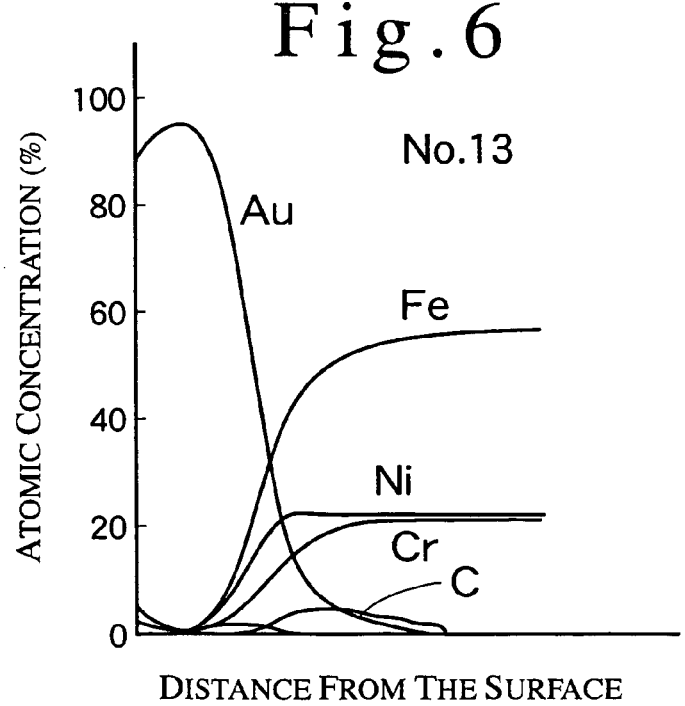
FIG. 6 is a chart of Auger analysis given in Example 1, No. 13 of the working example of the invention.

The samples were subjected to corrosion tests by immersing in boiling sulfuric acid of pH2 for 168 hours and the dissolution was observed. The quantities of Fe-, Ni- and Cr-ions dissolved out into 400 mL of the sulfuric acid were quantitated. The cases where the quantity of Fe-ion dissolution exceeds 0.2 mg or the total quantity of Fe+Ni+Cr-ions dissolution exceeds 0.3 mg were judged dissatis-factory. The judgment is shown also in Table 1. The charts of Auger analysis of Run No. 1 (satisfactory) and Run No. 13 (dissatisfactory) are shown in FIG. 5 and FIG. 6, respectively.

Example 2

Figure 7:
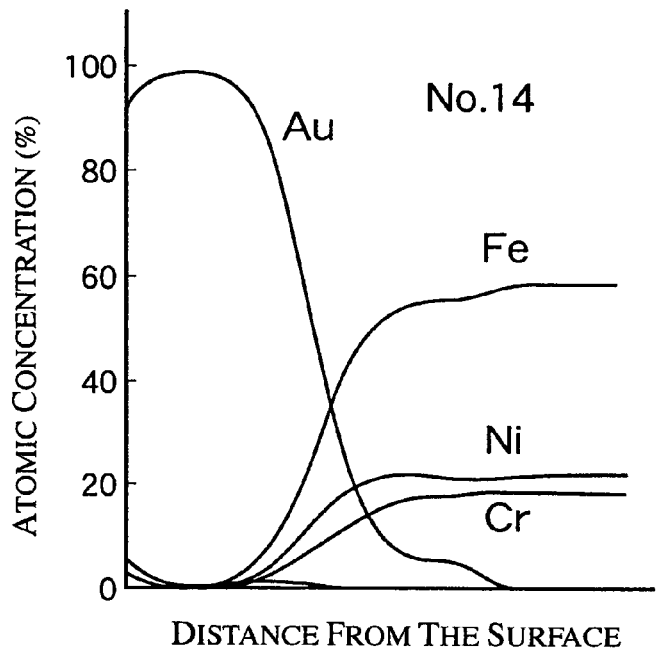
FIG. 7 is a chart of Auger analysis given in Example 2, No. 14 of the working example of the invention.
Figure 8:
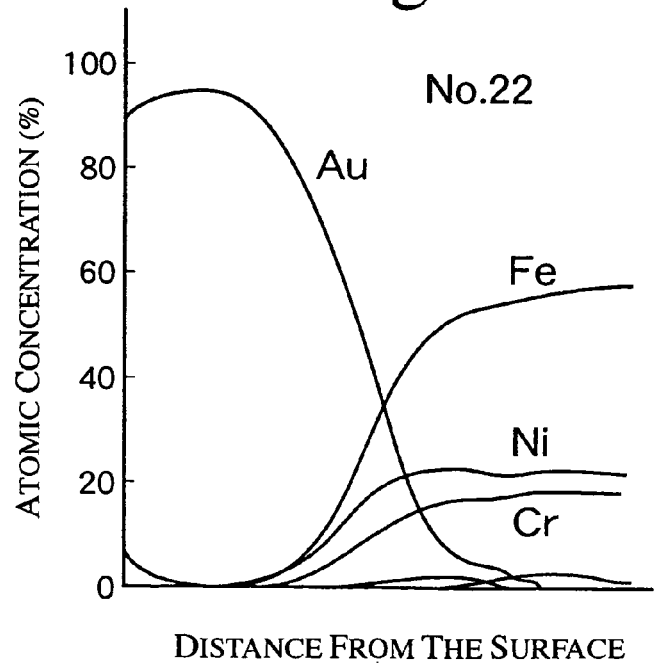
FIG. 8 is a chart of Auger analysis given in Example 2, No. 22 of the working example of the invention.

The procedures of Example 1 were repeated with so altered conditions for electroplating that the plated Au layers become 40 nm thick. The resulting corrosion resistant conductive parts were subjected to Auger analysis and the corrosion tests. The results are shown in Table 2. The charts of Auger analysis of Run No. 14 (satisfactory) and Run No. 22 (dissatisfactory) are shown in FIG. 7 and FIG. 8, respectively.

TABLE 1

| No. | "v" (%) | M/L (%) | p/p + q (%) | Ion Dissolution (mg) | | | | Judgment |
|---|---|---|---|---|---|---|---|---|
| | | | | Fe | Ni | Cr | Total | |
| 1 | 98.0 | 92.8 | 93.4 | 0.04 | 0.01 | 0.01 | 0.06 | good |
| 2 | 98.1 | 90.9 | 91.8 | 0.03 | 0.01 | 0.01 | 0.05 | good |
| 3 | 98.0 | 92.4 | 89.3 | 0.06 | 0.02 | 0.01 | 0.09 | good |
| 4 | 98.2 | 91.3 | 88.7 | 0.07 | 0.02 | 0.01 | 0.10 | good |
| 5 | 98.2 | 89.4 | 90.1 | 0.08 | 0.02 | 0.01 | 0.11 | good |
| 6 | 98.0 | 88.3 | 92.4 | 0.08 | 0.03 | 0.02 | 0.13 | good |
| 7 | 98.1 | 83.2 | 83.0 | 0.07 | 0.02 | 0.03 | 0.12 | good |
| 8 | 98.0 | 84.7 | 87.2 | 0.08 | 0.03 | 0.03 | 0.14 | good |
| 9 | 96.3 | 90.1 | 90.1 | 0.32 | 0.07 | 0.05 | 0.44 | no good |
| 10 | 95.9 | 90.3 | 82.6 | 0.30 | 0.07 | 0.06 | 0.43 | no good |
| 11 | 97.6 | 88.8 | 90.0 | 0.25 | 0.05 | 0.05 | 0.35 | no good |
| 12 | 97.5 | 88.9 | 83.7 | 0.31 | 0.09 | 0.07 | 0.47 | no good |
| 13 | 95.5 | 87.9 | 96.7 | 0.21 | 0.09 | 0.07 | 0.37 | no good |

TABLE 2

| No. | "v" (%) | M/L (%) | p/p + q (%) | Ion Dissolution (mg) | | | | Judgment |
|---|---|---|---|---|---|---|---|---|
| | | | | Fe | Ni | Cr | Total | |
| 14 | 98.3 | 93.0 | 94.1 | 0.05 | 0.01 | 0.01 | 0.06 | good |
| 15 | 98.2 | 91.8 | 93.0 | 0.07 | 0.01 | 0.01 | 0.09 | good |
| 16 | 98.0 | 94.3 | 84.8 | 0.10 | 0.06 | 0.03 | 0.19 | good |
| 17 | 98.1 | 97.5 | 88.4 | 0.09 | 0.06 | 0.02 | 0.17 | good |
| 18 | 98.3 | 88.0 | 90.1 | 0.09 | 0.06 | 0.05 | 0.20 | good |
| 19 | 98.0 | 87.3 | 90.2 | 0.10 | 0.08 | 0.06 | 0.24 | good |
| 20 | 98.2 | 88.8 | 87.7 | 0.09 | 0.06 | 0.05 | 0.20 | good |
| 21 | 98.2 | 85.7 | 87.3 | 0.10 | 0.07 | 0.06 | 0.23 | good |
| 22 | 97.6 | 90.1 | 88.5 | 0.29 | 0.07 | 0.05 | 0.41 | no good |
| 23 | 96.7 | 90.3 | 92.4 | 0.34 | 0.09 | 0.08 | 0.51 | no good |

We claim:

1. An electrolytic gold layer on a metal substrate in a corrosion resistant conductive part, the gold layer being made by electrolytically forming a thin layer of gold of a thickness 100 nm or less on at least a part of the metal substrate, wherein the maximum value "v" of atomic concentration of gold given by Auger analysis is 98% or more of the total atomic concentrations of all the elements, which is deemed to be 100%, in the thin gold layer ranging from the surface to the interface of the gold layer and the metal substrate.

2. The electrolytic gold layer on a metal substrate in a corrosion resistant conductive part according to claim 1, wherein (M/L)×100(%) is 90% or higher, where "M" is the value obtained by integrating the atomic concentration of gold given by Auger analysis in the range from the surface to the interface of the gold layer and the metal substrate, and "L" is the value obtained by integrating the atomic concentration of gold given by Auger analysis in the range from the surface to the interface where gold substantially disappears.

3. The electrolytic gold layer on a metal substrate in a corrosion resistant conductive part according to claim 1, wherein [p/(p+q)]×100(%) is 90% or higher, where "p" is the atomic concentration of gold given by Auger analysis at the surface, and "q" is the total of the atomic concentrations of the elements other than gold given by Auger analysis at the surface.

4. The electrolytic gold layer on a metal substrate in a corrosion resistant conductive part according to claim 1, wherein the substrate metal is an austenitic stainless steel.

5. The electrolytic gold layer on a metal substrate in a corrosion resistant conductive part according to claim 1, wherein the part is a metal separator for a fuel cell.

6. An electrolytic gold layer on a metal substrate in a corrosion resistant conductive part made by electrolytically forming a thin layer of gold of a thickness 100 nm or less on the metal substrate having an averaged surface roughness "Ra" in a measured area of 50 μm² of 50 nm or less, wherein the maximum value "v" of atomic concentration of gold given by Auger analysis is 98% or more of the total atomic concentrations of all the elements, which is deemed to be 100%, in the thin gold layer ranging from the surface to the interface of the gold layer and the metal substrate.

7. The electrolytic gold layer on a metal substrate in a corrosion resistant conductive part according to claim 6, wherein (M/L)×100(%) is 90% or higher, where "M" is the value obtained by integrating the atomic concentration of gold given by Auger analysis in the range from the surface to the interface of the gold layer and the metal substrate, and "L" is the value obtained by integrating the atomic concentration of gold given by Auger analysis in the range from the surface to the interface where gold substantially disappears.

8. The electrolytic gold layer on a metal substrate in a corrosion resistant conductive part according to claim 6, wherein [p/(p+q)]×100(%) is 90% or higher, where "p" is the atomic concentration of gold given by Auger analysis at the surface, and "q" is the total of the atomic concentrations of the elements other than gold given by Auger analysis at the surface.

9. The electrolytic gold layer on a metal substrate in a corrosion resistant conductive part according to claim 6, wherein the substrate metal is an austenitic stainless steel.

10. The electrolytic gold layer on a metal substrate in a corrosion resistant conductive part according to claim 6, wherein the part is a metal separator for a fuel cell.

11. An electrolytic gold layer on a metal substrate in a corrosion resistant conductive part made by electrolytically plating a thin layer of gold of a thickness 100 nm or less on the metal substrate without subsequent compressing of the plated gold layer, wherein the maximum value "v" of atomic concentration of gold given by Auger analysis is 98% or more of the total atomic concentrations of all the elements, which is deemed to be 100%, in the thin gold layer ranging from the surface to the interface of the gold layer and the metal substrate.

12. The electrolytic gold layer on a metal substrate in a corrosion resistant conductive part according to claim 11, wherein (M/L)×100(%) is 90% or higher, where "M" is the value obtained by integrating the atomic concentration of gold given by Auger analysis in the range from the surface to the interface of the gold layer and the metal substrate, and "L" is the value obtained by integrating the atomic concentration of gold given by Auger analysis in the range from the surface to the interface where gold substantially disappears.

13. The electrolytic gold layer on a metal substrate in a corrosion resistant conductive part according to claim 11, wherein [p/(p+q)]100(%) is 90% or higher, where "p" is the atomic concentration of gold given by Auger analysis at the surface, and "q" is the total of the atomic concentrations of the elements other than gold given by Auger analysis at the surface.

14. The electrolytic gold layer on a metal substrate in a corrosion resistant conductive part according to claim 11, wherein the substrate metal is an austenitic stainless steel.

15. The electrolytic gold layer on a metal substrate in a corrosion resistant conductive part according to claim 11, wherein the part is a metal separator for a fuel cell.

* * * * *